United States Patent
Ou et al.

(10) Patent No.: US 12,143,370 B1
(45) Date of Patent: Nov. 12, 2024

(54) SECURED ASYNCHRONOUS COMMUNICATION

(71) Applicant: Huei Meng Chang, Milpitas, CA (US)

(72) Inventors: Frank Y. Ou, Fremont, CA (US); Huei Meng Chang, Milpitas, CA (US); Dennis C Lau, Cupertino, CA (US)

(73) Assignee: Huei Meng Chang, Milpitas, CA (US)

( * ) Notice: Subject to any disclaimer, the term of this patent is extended or adjusted under 35 U.S.C. 154(b) by 292 days.

(21) Appl. No.: 17/141,209

(22) Filed: Jan. 4, 2021

Related U.S. Application Data

(60) Provisional application No. 62/956,236, filed on Jan. 1, 2020.

(51) Int. Cl.
   *H04L 9/40* (2022.01)
   *G16Y 30/10* (2020.01)
   *H04L 9/30* (2006.01)
   *H04L 67/1095* (2022.01)
   *H04L 67/1097* (2022.01)

(52) U.S. Cl.
   CPC .......... *H04L 63/0428* (2013.01); *G16Y 30/10* (2020.01); *H04L 9/3073* (2013.01); *H04L 67/1095* (2013.01); *H04L 67/1097* (2013.01)

(58) Field of Classification Search
   CPC ..................... H04L 63/0428; G16Y 30/10
   See application file for complete search history.

(56) References Cited

U.S. PATENT DOCUMENTS

| | | | |
|---|---|---|---|
| 2017/0171313 A1* | 6/2017 | Britt | H04L 9/0838 |
| 2018/0183832 A1* | 6/2018 | Chang | H04L 63/0428 |
| 2018/0343238 A1* | 11/2018 | Tola | H04L 63/0421 |

\* cited by examiner

*Primary Examiner* — Esther B. Henderson

(57) ABSTRACT

Asynchronous communications between IoT (Internet of Things) devices on a network are disclosed. The asynchronous communications between IoT devices are facilitated by a centralized device on the communication network. For example, a first IoT device encrypts a message for a second IoT device. The first IoT device opens a temporary communication channel for the purpose of sending the message to the centralized device, after which the communication channel is closed. The second IoT device polls the centralized device by opening a temporary communication channel to retrieve the encrypted message, after which the communication channel is closed.

14 Claims, 6 Drawing Sheets

SECURED ASYNCHRONOUS COMMUNICATION

CROSS-REFERENCE TO RELATED APPLICATION

This application claims the benefit of U.S. Provisional Patent Application No. 62/956,236, filed on Jan. 1, 2020, which is herein incorporated by reference in its entirety for all purposes.

FIELD OF THE INVENTION

The present disclosure relates to secured communication between devices, such as IoT devices over a communication network. In particular, the present disclosure relates to secured asynchronous communication between devices.

BACKGROUND

Communication between IoT (Internet of Things) devices over a communication network often is not secured. Today there are devices that can communicate relatively securely, but the implementation may be complicated. IoT devices in general are relatively simple and may not be able to be equipped with very complex security circuit or software. Unsecured communication between IoT devices poses significant security risks and may even be dangerous to people's health if the IoT devices are hooked up to patients.

For the foregoing discussion, it is desirable to provide secured communications between IoT devices without complicated systems or procedures.

SUMMARY

Embodiments generally relate to secured communications between IoT devices. In one embodiment, a method for asynchronous communication between IoT devices is disclosed. The method includes encrypting a message by a first IoT device. The first IoT device opening a first external communication channel to a communication network. The encrypted message is sent to a centralized device coupled to the communication network. After sending the encrypted message, the first external communication channel is closed. A second IoT device polls the centralized device for incoming messages. Polling includes opening a second external communication channel to the communication network. The centralized device is checked for incoming messages for the second IoT device. The encrypted message from the first IoT device is downloaded. After downloading the encrypted message, the second external communication channel is closed.

In another embodiment, an asynchronous communication system disclosed. The asynchronous system includes a centralized device coupled to a communication network and a storage system coupled to the communication network and the centralized device. The storage system can be configured to attach to the communication network and to function in conjunction with the centralized device. Or the storage system can be configured to attach only to the centralized device and not directly attach to the communication network. Both configurations are possible. The centralized device is configured to receive messages (incoming messages) from IoT devices via the communication network. The incoming messages from the IoT devices are stored for retrieval. It is possible to store all the content of each message. It is also possible to store only a portion of the content of each message. It is possible that both methods are employed at the same time. Some messages are store entirely and some messages are store partially. In reality any content that needs to be retrieved by another device will have to be stored. We can view the storage as two storage system, one for small content and one for large content. The intent of mentioning a specific storage system if to store large content. The available messages for retrieval are listed when a retrieving IoT device polls the centralize device. There are many methods to list the available messages. For example, one is for the centralized system to list only messages intended for the polling device. Another method is to make all messages available to all poll devices.

In yet another embodiment, an IoT device is disclosed. The IoT device includes a secured communication module for secured communication with other IoT devices via a communication network. The secured communication module comprise includes an asynchronous communication block and an encryption block, which can include both encryption and decryption capabilities. The encryption block is configured to encrypt an outgoing message (encrypted outgoing message) from the IoT device to a receiving IoT device. The asynchronous communication block is configured to send the encrypted outgoing message to a centralized device coupled to the communication module for retrieval by the receiving IoT device.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following, in which.

DETAILED DESCRIPTION

Embodiments described herein generally relate to secured communication between IoT devices. The secured communication can be asynchronous or real-time. In some embodiments, secured asynchronous communication is established between a command center and the IoT devices. Asynchronous communication is also established between IoT devices. For example, asynchronous communication may be established directly between any IoT devices (e.g., without the command center).

Figure 1:
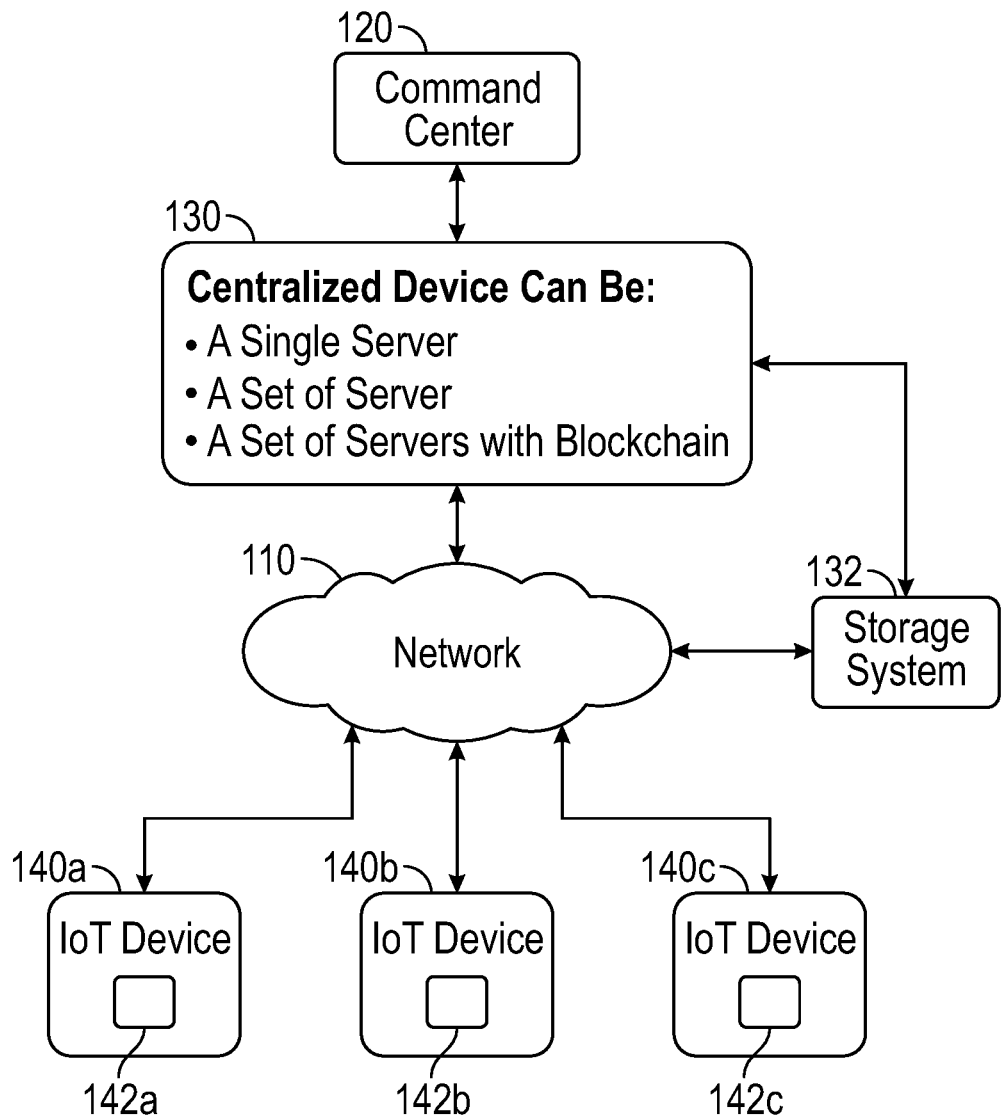
FIG. 1 illustrates a simplified block diagram of an exemplary communication system.

FIG. 1 shows a simplified block diagram of an embodiment of a communication system 100. The communication system includes a centralized device 130 connected to a network 110. The network, for example, may be a telecommunication network. The telecommunication network, for example, is a wireless telecommunication network, such as a 2G, 3G, 4G, 5G, or a combination thereof. Other types of telecommunication networks, such as a wireline communication network, or combinations of networks may also be useful. The network can be a private network or the public Internet and may include lease lines or virtual private network (VPN).

This centralized device, for example, is a conceptually centralized device. The centralized device can be a computer, a virtual computer in the cloud, or many computers or virtual computers or servers networked together, forming a centralized system. For example, the centralized device may be a centralized system. The computers of the system may each contain the full data set or partial data set. The system may utilize numerous computers for redundancy purposes, such as acting as backups to each other, or to act as load balance to client devices, or to serve both functions at the same time.

The communication system also includes a command center 120 coupled to the network. The command center, for example, can consist of a cluster of computers, a single computer; or the command center can be an IoT device itself; or the command center can be the combination of computers and IoT devices. More than one command center may be coupled to the communication network. The command center can be situated in a communication service provider facility and owned and operated by the communication provider. Also, the command center can be situated in a private company as long as there is network access.

A plurality of IoT devices may be communicably coupled to the communication network. As shown, IoT devices $140_{1-3}$ are shown to be communicably coupled to the communication network. It is, however, understood, that many more IoT devices may be communicably coupled to the communication network. The IoT device may be any kind of IoT devices, such as a mobile phone, a computer, an information device, or any other type of an IoT device, including a building control system, an appliance, a vehicle as well as others.

In one embodiment, an IoT device is configured with a secured communication module 142. The secured communication module, in one embodiment, enables the IoT device to communicate securely with other IoT devices on the communication network. For example, the secured communication module is configured to enable IoT devices to securely communicate asynchronously over the communication network.

In one embodiment, the secured communication module is implemented with logic to effect asynchronous communication. In one embodiment, the secured communication module may be implanted using a field programmable gate array (FPGA) or application specific integrated circuit (ASIC). Other implementations of the secured communication module may also be useful. For example, the secured communication module may be implemented as a circuit board or a computer. In one embodiment, the secured communication module is configured to be easily incorporated into existing IoT devices, retrofitting them with an asynchronous communication function. Alternatively, the secured communication module can be incorporated into new IoT devices. This enables designers to focus on the functionality of the IoT device. A secured communication module can be just a software module to be incorporated in the software of an IoT device. Hardware module may make integration easier. Often an IoT device software is very tightly coupled with the device control and device function; it may not be easy to add new software routines. Hardware implementation has another benefit. It cannot be hacked by software intrusion alone. It can be thought of as a protection against software hacking.

In one embodiment, the secured communication module includes a secured asynchronous communication. The centralized device serves as an intermediary or agent for communication between two IoT devices. For example, a first IoT device 1401 wants to communicate with a second IoT device 1402. In such a case, the first IoT device sends a message designated for the second IoT device to the centralized device. The second IoT device polls the centralized device to see if there are any messages directed to the second IoT device. Messages for the second IoT device are retrieved.

In one embodiment, the centralized device serves as a repository of messages from one IoT device to another IoT device. The messages, for example, may be stored in a storage system 132 which is coupled to the centralized device and the network. In one embodiment, the storage system may be a distributed storage system. Providing a distributed storage system is advantageous for messages with a large amount of data. For example, the data is stored in the distributed storage system, and the hashed checksum and a pointer to the stored data will be sent over the communication system. Besides using hashed checksum other methods to ensure that any alteration of the original message stored in the storage system is detected are acceptable.

When an IoT device polls the centralized device, it is possible to allow the IoT device to access all messages in the centralized device. In such a configuration, the IoT device can retrieve all the messages from the storage system and/or the centralized device. It is up to the IoT device to decide what to do with messages not designated to it Providing a listing of all the messages simplifies the design of the centralized device. It is also possible that the centralized device is configured with a filter that filters out messages to enable an IoT device to access messages which are directed to it. In other embodiments, the centralized device may include a filter that enables an IoT device to view and access only those messages which are directed to it.

To protect the privacy of all the communications among IoT devices, each IoT device is configured to encrypt its messages. The receiving IoT device is configured to decrypt the message. Various encryption techniques may be employed. For example, public and private key pair encryption techniques may be employed. Other types of encryption techniques may also be useful.

As described, an IoT device may communicate to another IoT device via the centralized device. In other embodiments, an IoT device may broadcast and multicast messages to multiple or a group of IoT devices. For example, an IoT device may communicate using a predefined format to identify multiple IoT devices to which the message is broadcasted or multi-casted.

In one embodiment, the centralized device is implemented with a blockchain configuration. The blockchain configuration provides a decentralized centralized device, which is fault tolerant against computer failures and network failures. The decentralized centralized device is protected against DDOS attacks which are common to a centralized server system. IoT devices can choose among many blockchain servers to send and receive messages. The messages are maintained in the blockchain and are automatically distributed to all the blockchain servers. The messages will not disappear. The IoT devices can decide when to pick up the messages. A storage system here is particularly useful. Messages with large data content can be stored in the storage system. Only a hashed checksum needs to be stored in a blockchain. Other methods that can allow detection of alteration to the message content are useful. The intent here is to store a smaller among of data into the blockchain.

The blockchain implementation configured to function conjunction with the centralized device is not restricted to certain kind of blockchain. Many of the open source blockchain implementations, such as Hyperledger and Ethereum, can function properly with the centralized device. In one embodiment, the blockchain is a private blockchain, such that the blockchain nodes are configured to allow only the blockchain owner's servers to certify a new block. Even if Ethereum itself is a public blockchain, and anybody is allowed to join the blockchain network and participate in certifying a new block to the Ethereum blockchain, the Ethereum opensource code can be configured to restrict participants and allow only the blockchain nodes that the owner of the centralized device, which is also the owner of the blockchain functioned with the centralized device, designates to have the privilege to certify a new block to the blockchain. Configuring a blockchain to be a private blockchain eliminates the possibility that outsiders can maliciously alter the history blocks in a blockchain.

Asynchronous communication by an IoT device is secured. In reality it is nearly impossible to claim something 100% secured. This method is more secured than conventional methods. For example, an IoT device controls when an external communication channel is opened. For example, an IoT device opens an external communication channel when it wants to send a message. As for the receiving IoT device, it opens an external communication channel when it wants to check to see if there are any incoming messages. For example, an external communication channel is only opened when an IoT device wants to communicate with the centralized device (e.g., to send a message or to check for messages). There is no outside trigger to open up the communication channel of an IoT device. When the IoT device is not communicating with the centralized system, all the communication channels of the IoT device are close. This is unlike real-time communication where the external communication channel is always opened. As such, asynchronous communication eliminates or reduces opportunities for potential attacks to hack into the device.

When devices connect to the Internet, a firewall device is often employed to protect these Internet-connected devices. Some functions of a firewall device are sometimes implemented in software embedded in these Internet-connected devices to simplify the overall implementation by eliminate an external firewall device. IoT devices are often small, and it may be difficult to include many firewall functions in the embedded software. When IoT devices are connected to the Internet, hackers from anywhere around the world can send data to these IoT devices to attempt to find volubility to gain access. One simple method to fence off the would-be attackers is to refuse all data from the Internet. The asynchronous communication method allows the IoT devices to open a communication channel to the Internet only when necessary and significantly reduce the probabilities of being hacked. The asynchronous communication method can be applicable to devices beyond just IoT devices. When a device is connected to the Internet, the device usually is given a public Internet Protocol (IP) address. Having a public IP address allows the device to have the opportunity to communicate with everything that is connected to the Internet. Having a public IP address also allows hackers from all over the world to make attempt to hack into the device. Some firewall devices may employ Network Address Translation (NAT). With NAT, the IoT devices sit behind the firewall do not need public IP addresses, but the firewall itself still needs a public IP address. If the firewall is combined with the IoT device, the public IP address is attached to the IoT device. The simple method of shutting off Internet connect and opening the connection only when necessary will reduce the probability of being hacked. Even when NAT is used, if a connection is open all the time, there is still a chance for hackers to find vulnerability to hack in.

Asynchronous communication also allows each IoT device to send and to check for messages when it has computing resources available and/or when the IoT device can communicate over the network. Unlike a real-time, synchronous section, the IoT device has to respond within a certain time limit. Also, for synchronous communication, the network connectivity has to be maintained. If there is a break in the network, the connection is broken and needs to be re-established. Having a communication channel open all the time allows hackers time and opportunities to find vulnerability from outside the IoT devices. Especially if the IoT devices are attached to the Internet, then the hackers can continuously try something malicious over the Internet.

In addition, asynchronous communication enables IoT system diagnostics, monitoring, and debugging of the IoT system to be performed on the centralized device in the middle, especially a system with storage capability. For example, the IoT devices can send operational status and execution trace information to the centralized device. Engineers and human operators can view the status information from the centralized device to diagnose what has occurred during specific times of the IoT system operation. Often a device, such as an IoT device, tries to store debugging and diagnostics in its memory or storage. Often the internal memory and storage of an IoT device is not very large. Older data often have to be deleted. Sometimes when an IoT device crashes, memory content is lost, and storage may be corrupted. That will lead to lose valuable history information to find out the problem that leads to the crash. In another scenario, when an operator tries to coordinate the diagnostic and debugging of many IoT devices, which operates together as a group, it is much easier to examine data from a centralized location.

In one embodiment, IoT devices can be configured for synchronous communication. For example, the secured communication module can be configured to include an on-demand synchronous communication function. On-demand synchronous communication may require two IoT devices to exchange parameters to set-up a real-time communication session. Once both sides exchange the proper information, an on-demand synchronous session can be established. The on-demand nature can still make potential attacks difficult to penetrate the devices. Also, each time the on-demand section is set up, the networking parameters can be different, making it harder for potential attackers.

Figure 5:
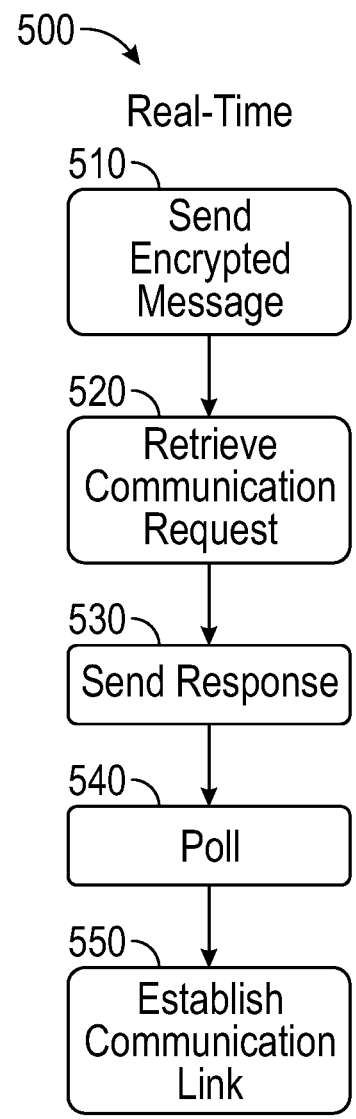
FIG. 5 shows an embodiment of a process for real-time secured communication.

FIG. 5 shows an embodiment of a process flow 500 for real-time or synchronous communication. For example, Party A wants to have a real-time or synchronous communication with Party B. At 510, Party A sends an encrypted message addressed to Party B to the centralized device. The message contains information regarding the requested communication. For example, the information may include the time of the communication and the port ID of Party A. Other information may also be included. To send the encrypted message, Party A opens a communication port to the centralized device. The encrypted message is sent to the centralized device. After sending the encrypted message, the open communication port is closed. The encrypted message from Party A is stored in the centralized device.

At 520, Party B retrieves the encrypted message from the centralized device. For example, Party B polls the centralized device to see if there are any messages for it. This includes opening a randomly chosen communication port through a firewall to the communication network to check the centralized server for incoming messages. The polling, for example, is periodically performed by Party B. The polling may be random and when Party B desires to access incoming messages. Any incoming messages addressed to Party B that are discovered on the centralized device are downloaded. For example, Party B retrieves the communication request from Party A. After each polling, the communication port is closed.

At 530, Party B responds to Party A's communication request with an encrypted response message. For example, the encrypted response message agrees to the real-time communication with Party A. In some cases, Party B may include details of its port ID that will be opened for the scheduled communication. Party B opens the communication channel and sends the encrypted response to the centralized device. After the response is sent, the communication channel is closed.

At 540, Party A polls the centralized device to see if there is a response from Party B. This includes opening a randomly chosen communication port through a firewall to the communication network to check the centralized server for incoming messages. The polling, for example, is periodically performed by Party A. The polling may be random and when Party A desires to access incoming messages. Any incoming messages addressed to Party A that are discovered on the centralized device are downloaded. For example, Party A retrieves the response to the real-time communication from Party B. After each polling, the communication port is closed.

In the case Party B does not respond, the request for the real-time communication is presumed to be decline. For example, Party A may poll the centralized server for a given time and if no response is found within the given time, the polling is stopped and the request is presumed to be declined. The given time, for example, may be fixed, predefined, or configurable by Party A.

At 550, a communication link is established. For example, a communication link is established at the scheduled time. This may be achieved by Party A opening up the communication link identified in the request and waits for Party B to join. Alternatively, Party B may open up the communication port identified in the response and waits for Party A to join.

In some cases, Party A may assume that Party B silently accepts and there is no need to poll for the response. At the scheduled time, Party A opens the designated communication port and waits for Party B to join.

In any case, even after agreement by the parties, one or both parties may choose to not participate in the real-time communication. If that happens, then the real-time communication set up is considered a failure.

In some cases, the scheduled time can be "NOW." In such a case, Party A will immediately open the communication port after sending the message to the centralized server and wait for Party B to join.

Figure 6:
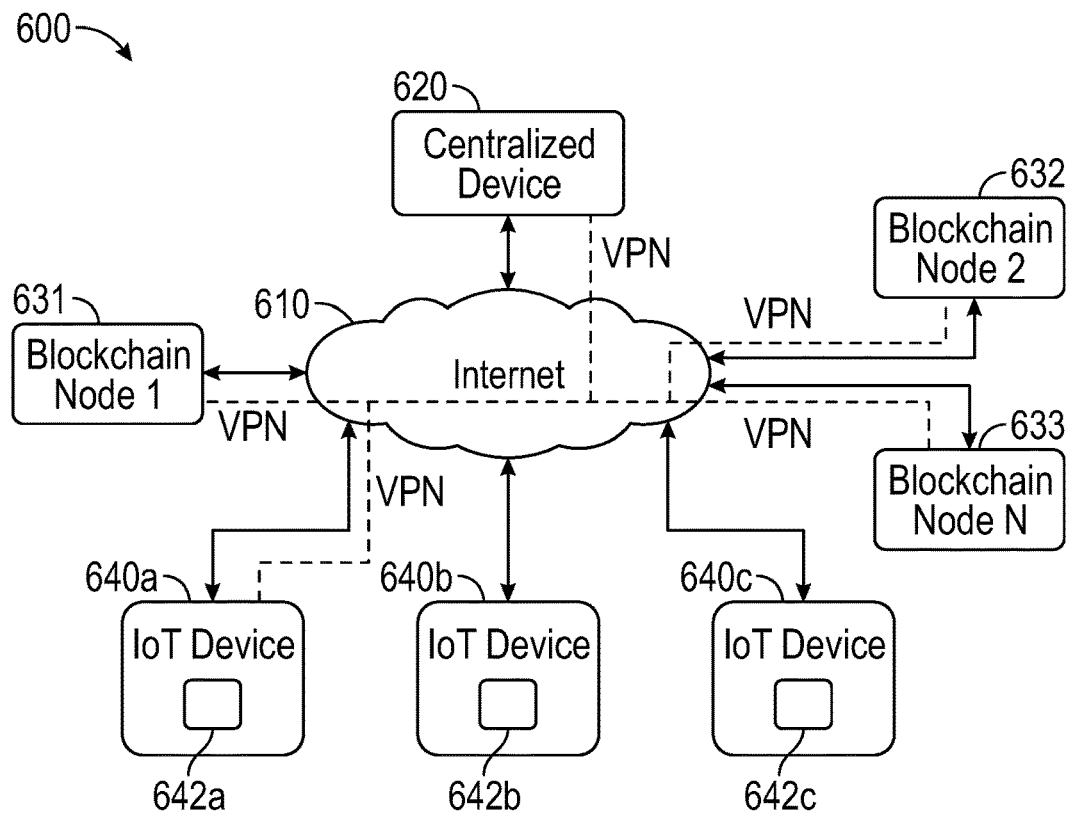
FIG. 6 illustrates a simplified block diagram of an exemplary communication system involving Blockchain Node 1 to Node N and utilizing VPNs.

In some embodiments, Parties A and B can optionally include unique blockchain identifiers in their preliminary communications to establish a secure way of identifying each other for the scheduled real-time communication. At the agreed-upon time Parties A and B open a direct encrypted communication channel via the network to their respective open ports. Technologies such as VPNs may be used to secure the open channel between the parties. Upon completion of the communication, Parties A and B immediately close their respective open ports. FIG. 6 illustrate a simplified diagram of an exemplary communication system utilizing VPNs. These VPNs are formed after the involved parties open up communication channels to perform real-time communications.

Figure 4:
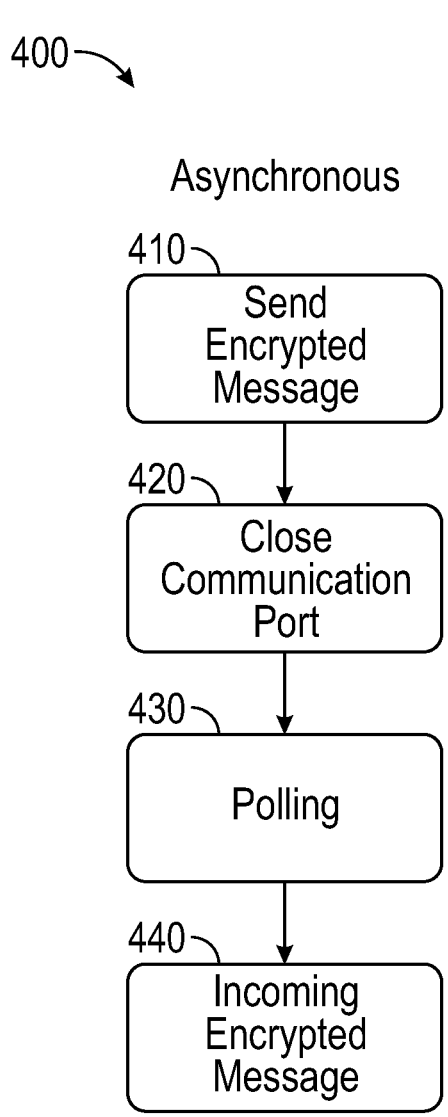
FIG. 4 shows an embodiment of a process for asynchronous secured communication.

FIG. 4 shows an embodiment of a process flow 400 for asynchronous communication. At 410, an IoT device A sends an encrypted message addressed to an IoT device B. This may include party A of IoT device A wanting to send an encrypted message to Party B of IoT device B. In other cases, IoT device A may be configured to send an encrypted message to IoT device B. In either case, a reference to an IoT device or a party may be either the IoT device or the Party. The message, for example, is configured to be sent asynchronously. To send the encrypted message, IoT device A opens a communication port to the centralized device. The encrypted message is sent to the centralized device.

At 420, after the encrypted message is sent, IoT device A closes the open communication port. The encrypted message from IoT device A is stored in the centralized device.

At 430, IoT device B polls the centralized device to see if there are any messages for it. For example, IoT device B opens a randomly chosen communication port through a firewall to the communication network and checks the centralized server for incoming messages. The polling, for example, is periodically performed by IoT device B. The polling may be random and when IoT device B desires to access incoming messages. Any incoming messages addressed to IoT device B that are discovered on the centralized device are downloaded to IoT device B at 440. After each polling, the communication port is closed.

In some embodiments, the two devices participating in the communication do not have to be two IoT devices. Both synchronous and asynchronous communications can be between two IoT devices, between one IoT device and the command center. If there are two command centers implemented, the communications can be between two command centers.

The centralized device is not restricted to just a device to relay messages. In an embodiment, the centralized device can be combined with the command center. The centralized device is connected to the Internet or a communication network via which other devices can communicate. The command center can be connected directly to the centralized device. In another embodiment, the command center can be connected to the centralized device through a private network. In yet another embodiment, the command center and the centralized device can be combined into one computer.

When an IoT device opens a communication port to poll the centralized device for asynchronous communication, the IoT device is not restricted to open only one communication port. In one embodiment, an IoT device can choose to open multiple communication ports to poll data from the centralized device. When setting up synchronous communication, the two parties (between IoT device A and IoT device B or between command center and an IoT device) involved in the communication can open up more than one communication port or communication channel. The number of ports or communication channels to open can be part of the messages sent to the centralized device for setting up the communication. The number of ports or communication channels can also be negotiated between the two parties after the first communication port or channel is set up and the two parties are communicating.

On-demand synchronous communication is not restricted to two parties. In one embodiment, the real-time communication can set up with multiple parties. For example, IoT device A can be communicating with IoT device B and the command center at the same time. IoT device C can be communicating with IoT device D and IoT device E at the same time. Each device can open up multiple communication ports and utilize the multiple communication ports to communicate with multiple devices. The information needed to set up communication with multiple devices can be included in the messages to the centralized device during setup time.

In one embodiment, the IoT device A establishes a real-time communication channel with IoT device B and IoT device C at the same time. The three IoT devices utilize the centralized device to perform the initial setup of the real-time communication channels. The IoT device B and IoT device C can utilize IoT device A as a relay to negotiate to open up a direct communication channel between IoT device B and IoT device C. The devices involve in this real-time communication are not restricted to IoT devices. The command center can participate the same way as any IoT device. For example, the command center can take the place of the IoT device A in the above description.

Figure 10:
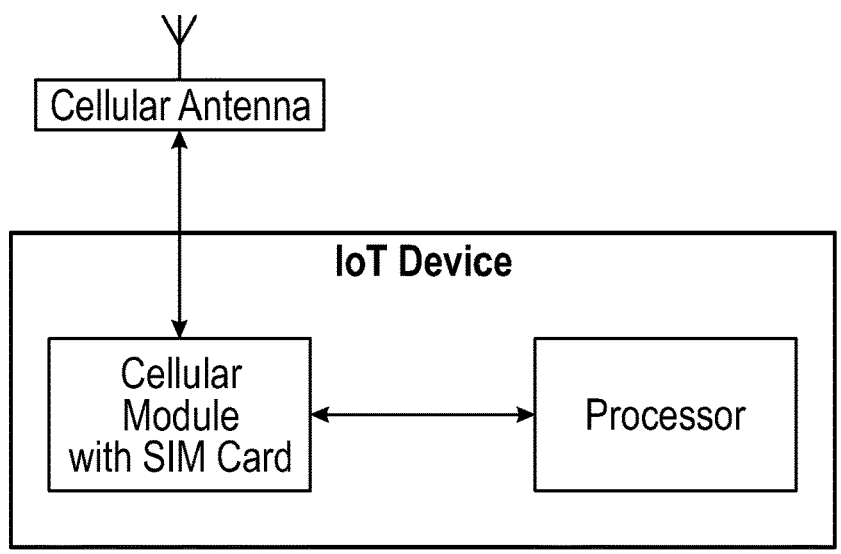
FIG. 10 illustrates a simplified block diagram of an IoT device with an embedded cellular module.

IoT devices are sometimes equipped with a cellular module to allow the IoT devices to connect the cellular network. A cellular network can be viewed as having two communication channels. One channel allows devices attached to the cellular network to send text messages. The other channel allows the devices attached to the cellular network to access the Internet, and this channel is often referred to as data service channel. The SMS messaging channel can utilize to send secured messages between two devices attached to the cellular network. FIG. 10 illustrate a simplified block diagram of a cellular module embedded within an IoT device. The interface between the cellular module and the IoT device can allow the IoT device to access the data service of the cellular network which can enable the IoT device to connect to the Internet. This interface can also allow the IoT device to retrieve SMS messages received by the cellular module. The cellular module usually stores the received SMS messages in the SIM card storage.

In one embodiment, a special communication mode can be configured. In this special mode, the assumption is that there is an established communication path between the two parties wishing to communicate.

Figure 2:
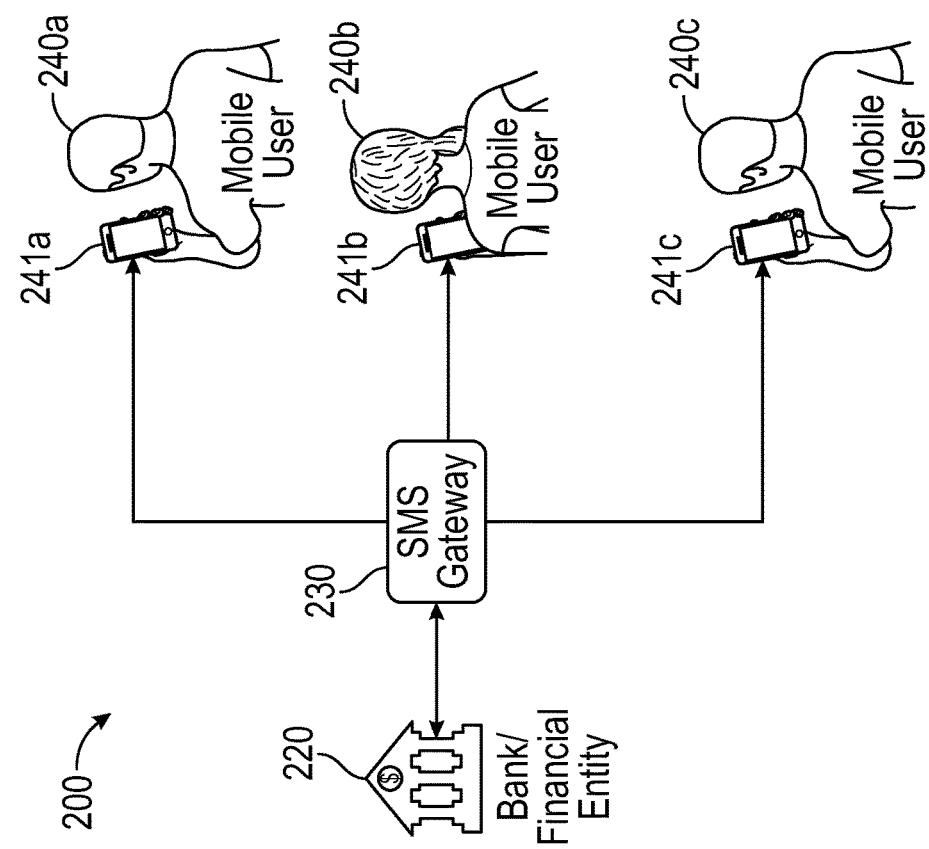
FIG. 2 illustrates an example of secured communication.

FIG. 2 illustrates an example of this special configuration 200. The special communication involves an SMS verification message. The established communication channel is the existing mobile carrier channel from one mobile phone to another mobile phone or from one computer with pre-arranged setup with a mobile carrier to a mobile phone. For example, SMS messages are commonly used to send verification codes which may be used to login or to execute a transaction. As shown, a financial institution 220 sends SMS verification messages to mobile users 240$_{1-3}$. Typically, the financial institution forwards the SMS verification messages to an intermediary, such as an SMS service company 230, which then relays the messages to the respective mobile users. Furthermore, the SMS messages may pass through an SMS gateway before receipt by the mobile users. For example, numerous SMS gateways serve as further intermediaries before the messages are delivered to the mobile users. As such, there are many intermediaries involved, resulting in the SMS message potentially being read by many people or machines, increasing the risk of hacking and fraud.

Figure 7:
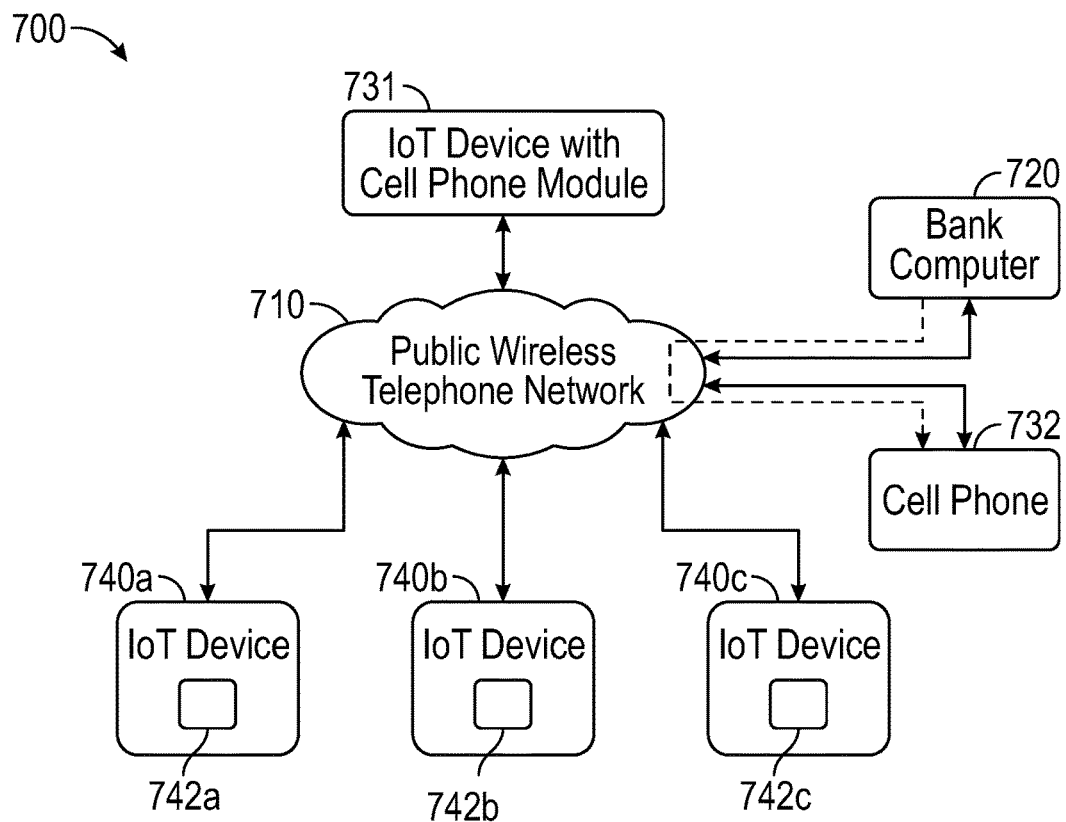
FIG. 7 illustrates a simplified block diagram of a bank directly sending encrypted SMS messages to a mobile phone.
Figure 8:
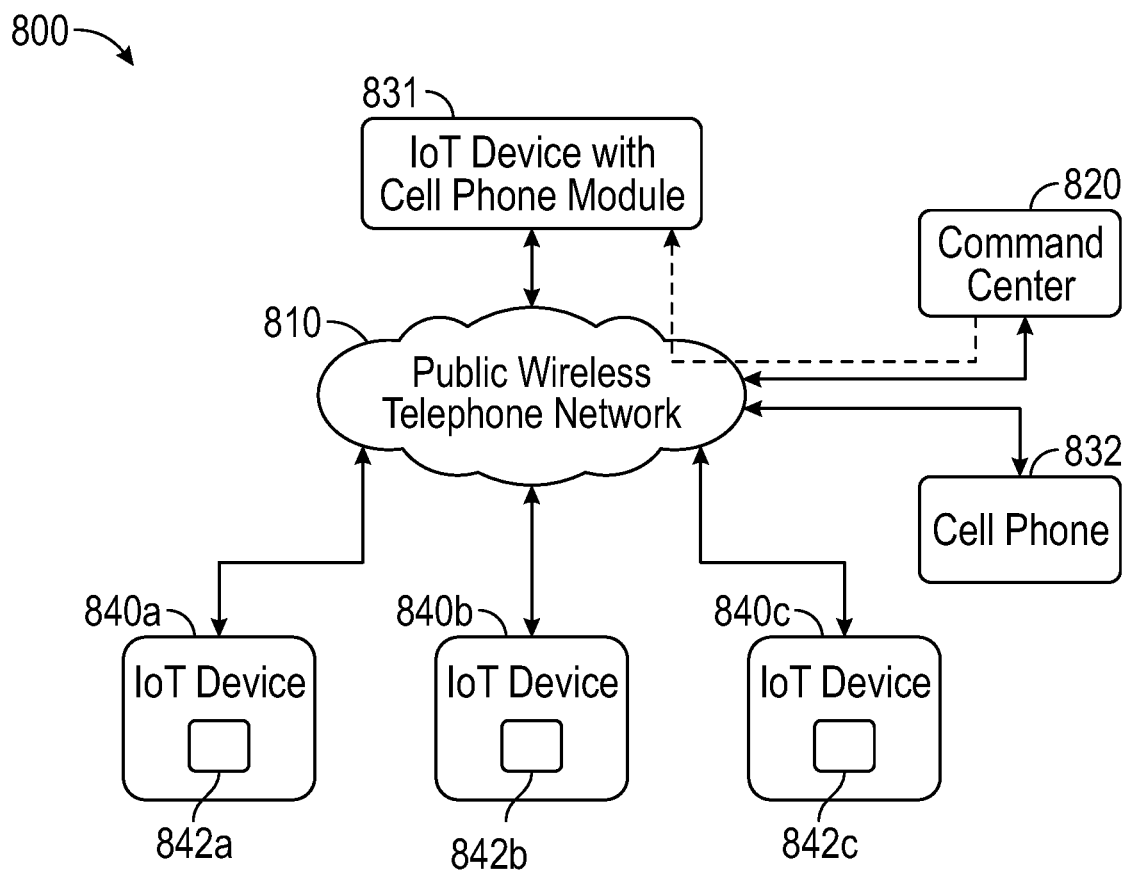
FIG. 8 illustrates a simplified diagram of the command center directly sending encrypted messages to an IoT device with embedded cellular module.
Figure 9:
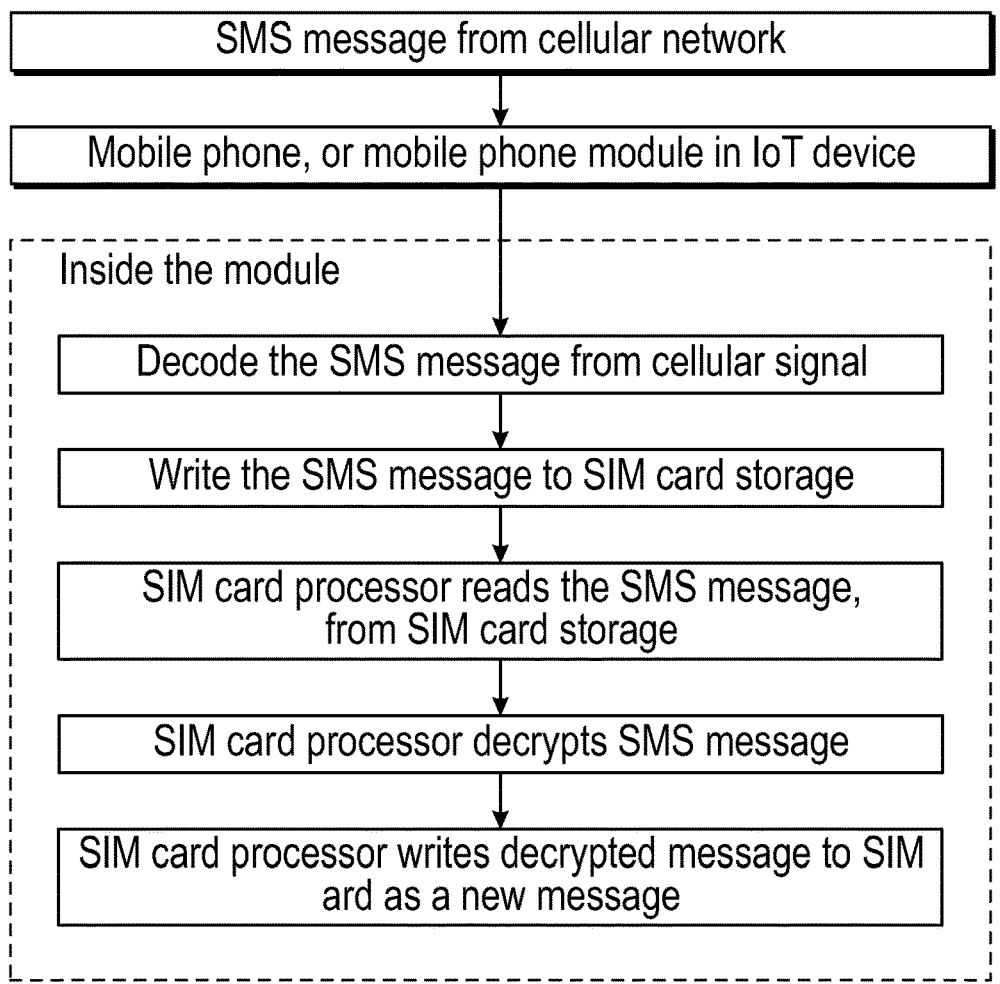
FIG. 9 illustrates a flow diagram of processing an encrypted SMS message.

However, the special communication configuration resolves such risks. For example, the financial institution may send an encrypted SMS message to the centralized device. The SMS service company may retrieve the SMS message from the centralized device and forwards it to the designated mobile user's or client's phone. The client's phone then decrypts the message, for example, using the processor within the phone's Subscriber Identity Module (SIM) card. In an alternative embodiment, the centralized device is avoided. For example, the sender sends the encrypted SMS message directly to the SMS service company. In yet another alternative embodiment, the sender can utilize the telephone carrier's network and directly send the encrypted SMS message to the mobile phone. FIG. 7 illustrate a simplified block diagram of a bank directly sending encrypted SMS messages to a mobile phone. FIG. 9 illustrate a simplified block diagram of a command center directly sending encrypted SMS messages to an IoT device.

In one embodiment, the SMS message is stored in the SIM card. The processor in the SIM card can be equipped with decryption capable software. The SIM card with decryption capable software is still compatible with existing SIM card software of mobile phones. The SIM card with decryption capable software will decrypt the SMS message being stored and write out a decrypted SMS message to the SIM card. When existing mobile phone software reads the SMS messages from the SIM card to display to the mobile phone user, the existing mobile phone software will display both the encrypted SMS message and the decrypted SMS message. The user interface to display the decrypted SMS message is kept the same as existing mobile phone software. FIG. 9 shows an exemplary flow of processing an encrypted SMS message when it arrives at a mobile phone with a SIM card equipped with decryption capable software. After the SMS message is decrypted, the SIM card processor writes the decrypted message to the SIM card storage as a new message. Existing mobile phone software that is designed to read SMS messages from the SIM card storage can display the decrypted message.

Figure 3:
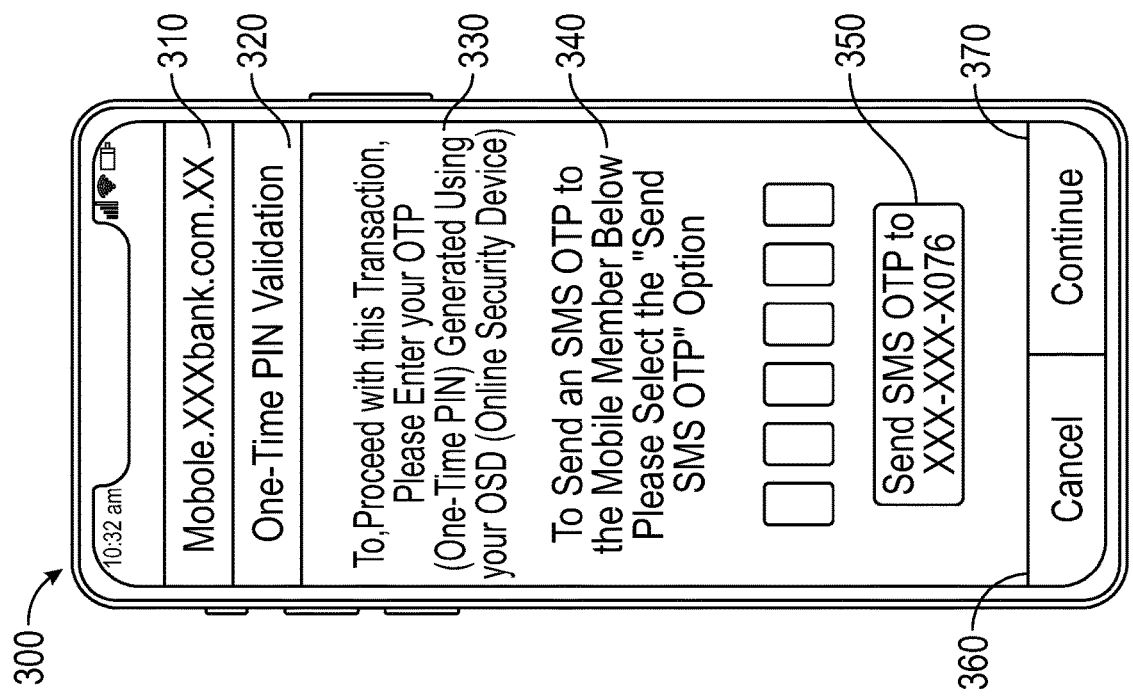
FIG. 3 shows and an embodiment of an interface on a mobile phone for secured communication.

FIG. 3 shows an alternative exemplary user interface (UI) 300 on a mobile phone with security information for sending a verification SMS message, for example, by the financial institution. The UI, for example, includes a sender information pane 310. For example, the sender information pane includes information of the sender, such as the individual in the financial institution sending the SMS message. A purpose pane 320 indicates the purpose of the SMS message. For example, the purpose is sending a one-time PIN (personal identification number) for validation to complete a transaction. Also, the UI includes an input pane 330. The sender, for example, enters the one-time PIN (OTP) for validation by the designated mobile user. An instruction pane 340 is also provided which indicates to the sender how to effect sending the OTP to the designated mobile user. Execution buttons may be provided. The execution buttons may include cancel and continue buttons. For example, a continue button 350 is provided to effect sending the OTP to the designated mobile user. For example, the sender may press the continue button 350 to send the OTP to the designated user. Alternatively, the sender may choose not to proceed with the action by selecting the cancel button 360.

At 430, IoT device B polls the centralized device to see if there are any messages for it. For example, IoT device B opens a randomly chosen communication port through a firewall to the communication network and checks the centralized server for incoming messages. The polling, for example, is periodically performed by IoT device B. The polling may be random and when IoT device B desires to access incoming messages. Any incoming messages addressed to IoT device B that are discovered on the centralized device are downloaded to IoT device B at 440. After each polling, the communication port is closed.

The inventive concept of the present disclosure may be embodied in other specific forms without departing from the spirit or essential characteristics thereof. The foregoing embodiments, therefore, are to be considered in all respects illustrative rather than limiting the invention described herein

We claim:

1. A method for securing a network-connected IoT device from external unauthorized communication comprising:
   disabling all external communication channels to a communication network connected to the IoT device;
   encrypting a message by the first IoT device needing to communicate with a second IoT device;
   opening a first and only external communication channel to the communication network;
   sending the encrypted message to a centralized device connected to the communication network;
   immediately closing the first and only external communication channel after sending the encrypted message has been completed;
   polling the centralized device by the second IoT device for incoming encrypted messages, wherein polling comprises opening a second and only external communication channel to the communication network,
   checking the centralized device for incoming encrypted messages from the second IoT device,
   downloading the encrypted incoming message from the centralized device, and
   closing the second and only external communication channel; and
   accepting incoming encrypted messages from the centralized device via a communication filter only when the external communication channel is open.

2. The method of claim 1, further comprising a polling module that will not generate a polling request at a fixed period of time.

3. The method of claim 1, wherein the external communication channel includes a direct first IoT device to second IoT device communication option comprising:
   encrypting a direct communication request by the first IoT device to the second IoT device, wherein the direct communication request includes a time of the direct communication request and a network port information of the direct communication request,
   establishing a communication link for the direct communication request by opening the network port for the direct communication request at the time of the direct communication request, and
   waiting for the second IoT device to join the direct communication request.

4. The method of claim 3, wherein the first IoT device is to close the direct communication channel if the second IoT device does not establish communication after a short period of time passed from the time set in the direct communication request.

5. The method of claim 4, wherein the short period of time is configurable by users.

6. The method of claim 3,
   wherein the requested direct communication time is set to a time after the direct communication request.

7. The method of claim 1, wherein the centralized device comprises a storage system to store messages from IoT devices.

8. The method of claim 7, wherein the centralized device comprises a private blockchain.

9. The method of claim 8, wherein the blockchain is implemented in multiple computers.

10. The method of claim 9, wherein the multiple computers implementing the blockchain communicate with an IoT device and provide messages to an IoT device through one or multiple of the multiple computers implementing the blockchain.

11. The method of claim 3, wherein the time and the network port information included in the direct communication request are different every time an IoT device requests a direct communication.

12. An IoT system of IoT devices, comprising:
    a secured communication module for securing itself from external unauthorized communication and having a secured communication channel with IoT devices via a communication network,
    wherein the secured communication module comprises secured communication block, and
    wherein the secured communication block is configured to send an encrypted message to a centralized device coupled to the secured communication module for retrieval by a receiving IoT device; and
    a communication filter configured to accept the encrypted message only when an external communication channel is open with the communication network.

13. The system of claim 12, wherein the centralized device comprises a private blockchain attached with multiple computers.

14. The system of claim 13, wherein the multiple computers implementing the blockchain each or together communicate with the IoT devices and one or several computers taken out the attached communication network do not affect an ability of the IoT devices being able to communicate with the centralized device.

* * * * *